Patented Jan. 17, 1950

2,494,726

UNITED STATES PATENT OFFICE 2,494,726

PROCESS FOR TREATING LIPOIDAL MATERIAL

Robert H. Sifferd, Lyons, and Jules D. Porsche, Clarendon Hills, Ill., assignors to Armour and Company, Chicago, Ill., a corporation of Illinois No Drawing. Application September 5, 1941, Serial No. 409,662

20 Claims. (Cl. 260—403)

This invention relates to processes of separating mixtures of compound lipids and other lipids for the isolation and recovery of such lipids.

Lipoidal material can be classified in three groups according to the following scheme (see Chemical Reviews, volume 2, page 244).

Classification of lipids

1. Simple lipids:
    Fats (glycerol esters of fatty acids)
    Waxes (alcohol esters of fatty acids)
2. Compound lipids
    2a. Phospholipids:
        Lecithin
        Kephalin
        Sphingomyelin
    2b. Glycolipids:
        Cerebrosides, such as phrenosin and kerasin
        Aminolipids
        Sulfolipids
3. Derived lipids:
    Fatty acids
    Sterols The isolation and recovery of the above lipids as relatively pure, or more highly concentrated substances, has hitherto been considered quite difficult, and no satisfactory method has, up to the present time, been available for the separation of mixtures of two or more differently classified lipids. Yet the isolation of cholesterol, for example, from animal tissue is important commercially, and any way of obtaining a separation of the compound lipids, for example, from other lipids in a satisfactory manner would have marked commercial importance in this art. Lipids generally can be characterized as being insoluble in water and soluble in fat solvents, although there are variations in the physical properties of the individual compounds. For example, the lecithins are somewhat soluble in water but insoluble in acetone. Lecithin is a compound lipid as indicated in the above table. Other compound lipids, such as the cerebrosides, dissolve in ether only with great difficulty, yet ether is in general a good lipid solvent.

All three groups of lipids frequently occur in nature admixed with each other and, as stated, no direct and satisfactory way has hitherto been available for the separation of these substances, one from another.

We have now discovered that mixtures containing compound lipids and other lipids, either the simple lipids or derived lipids, or both, can be separated provided such mixtures are treated with ethylene dichloride in the presence of water. Under such conditions the compound lipids dissolve or disperse in the aqueous phase whereas the simple and derived lipids dissolve in the ethylene dichloride phase. From the aqueous phase we can then obtain purified compound lipids and from the ethylene dichloride phase we can recover a mixture of simple and derived lipids when both are present. Such a mixture can then be separated into its constituents, as we shall presently describe.

In general, our process consists in preparing a mixture containing the lipid material, water, and ethylene dichloride and then allowing stratification of the mixture to occur whereupon two dissimilar liquid layers are obtained. However, we can vary our procedure by extracting moisture-laden lipid material with ethylene dichloride for the separation of simple or derived lipids therefrom and thus obtaining a residue containing the compound lipids.

The presence of moisture during the extraction or separation with ethylene dichloride is necessary in order for the compound lipids to remain undissolved in the ethylene dichloride. Were no moisture present then the compound lipids would also dissolve in the ethylene dichloride along with the other lipid material. But the amount of moisture present is variable and should be enough to insure that the compound lipids do not go into the ethylene dichloride phase, which, expressed in terms of amount of compound lipids, is at least 10% by weight of the compound lipids contained in the material treated. This quantity of moisture is generally approximately 10% or more of the quantity of solid material from which the lipid substances are extracted.

Our invention is applicable to a wide variety of separation, for example, sterols, which are derived lipids, can be separated from nerve tissue in which they are found associated with compound lipids but in which there is relatively little fat or simple lipid present. Phosphatides, which are compound lipids, can be recovered from mixtures in which they are associated with fats and sterols. Egg yolk is a good example of such a mixture. Residues obtained after the extraction of liver tissue with water for the recovery of antianemic principles can be treated by our process for the separation of a sterol-fat mixture containing an anti-menorrhagic factor, vitamins A, D, K, etc. and these factors can be subsequently recovered in a highly concentrated state. Progesterone, a steroid substance, can be obtained from ovaries free of phospholipins.

In the molecular distillation of sterols or steroid substances from fatty mixtures, the fatty mixtures can be first treated by our process to remove the compound lipids. The fraction containing fats and derived lipids can then be distilled by the short path distillation method to obtain sterols, or derived lipids, uncontaminated with compound lipids.

We shall now give more specific examples illustrating how our invention can be applied.

Cholesterol, a derived lipid, occurs in nerve tissue, such as spinal cord, in association with compound lipids. Consequently, before the cholesterol can be obtained in a high degree of purity, it is essential that the cholesterol be separated from the compound lipids. This can be done as follows.

*Example 1*

100 pounds of fresh spinal cord containing its normal moisture content is finely hashed and extracted by mechanical agitation with about 30 gallons of ethylene dichloride for about two hours. The mixture is then allowed to stand for about thirty minutes during which insoluble material separates and the ethylene dichloride layer is drawn off. The tissue residue is re-extracted with about 20 gallons of ethylene dichloride in the same manner and the extract drawn off as before. The remaining tissue residue is extracted once more with about the same quantity of ethylene dichloride and in the same manner, and the extract recovered. The three extracts are then combined and agitated with about 5 pounds of a clarifying agent, such as a decolorizing carbon, activated earths, and the like, and the clarifying agent removed by filtration. The filtrate is then concentrated by evaporation to a volume of about 3 gallons. The hot concentrated filtrate is then allowed to cool whereupon crude crystalline cholesterol separates out. This crude product can be used as such when a highly purified material is not desired. The crude cholesterol can be filtered off and recrystallized from about a gallon of hot ethylene dichloride. Further recrystallization from about 3 gallons of alcohol is desirable when a highly purified product is wanted. The resulting cholesterol has a melting point of about 147° C. to 148° C. and the yield is from 3 to 3½ pounds.

In the above instance the normal moisture content of the spinal cord is sufficient to prevent solution of the compound lipids in the ethylene dichloride and thus separation of the compound lipids from the sterol is obtained. The same general process can be applied to dried spinal cord, an article of commerce, provided a sufficient amount of moisture is present.

It is not necessary that the animal tissue used in our process be admixed with water so long as enough moisture is associated in the tissue to insure the separation. If the material is extremely dry then more water can be added. But, as pointed out above, the amount of water present during the treatment with ethylene dichloride is variable depending on the nature of the animal tissue, its moisture content, its content of compound lipids, and like factors.

We find it advantageous where the lipid material being used does not contain the desired amount of moisture, to mix the ethylene dichloride with the lipid material and after this has been done add the desired amount of water. By following this procedure the process works more smoothly and a more homogeneous mass is obtained with greater ease of manipulation. The following example number 2 illustrates this feature in connection with the isolation of cholesterol.

*Example 2*

2.2 pounds of dried spinal cord are agitated with one gallon of ethylene dichloride for 50 minutes. To the mixture are then added 2 quarts of water and agitation is continued for an additional hour. The whole is then allowed to settle and 5.3 quarts of ethylene dichloride extract is drawn off. The aqueous residue is re-extracted twice with 5 quart portions of ethylene dichloride and the solvent extracts recovered and combined with the original extract. The total is then concentrated to a point where the liquid boils at about 87° C. at which time distillation is stopped. The resulting liquid residue is chilled to cause separation of cholesterol crystals which are then recovered in a basket type centrifuge. There are thus recovered 3.1 ounces of cholesterol.

The above examples illustrate the separation of a derived lipid from a compound lipid wherein the principal product recovered is the derived lipid. We shall now give an example of the recovery of a compound lipid as the principal final product.

*Example 3*

Lecithin, a compound lipid, occurs in dried egg yolk and its recovery therefrom is an important commercial process. For the recovery and isolation of lecithin from dried egg yolk it is advantageous to first extract the yolk with ordinary alcohol. About 50 pounds of dried egg yolk are mixed with 10 gallons of alcohol and the mixture stirred for an hour. This mixture is filtered through a bag filter or in any other convenient way, and the solid filter cake reextracted three or more times in the same way with 6 gallon portions of alcohol. The alcoholic extracts are combined, filtered again, and evaporated to about 1½ to 2 gallons by ordinary distillation. About 6 gallons of water are then added and heated with agitation until the mixture assumes the characteristics of a homogeneous cream.

About 10 gallons of ethylene dichloride are then admixed with the crude lecithin emulsion and the mixture stirred for about twenty minutes. When the stirring is stopped the mixture breaks rapidly into two layers. The lower ethylene dichloride layer is drawn off and the supernatant aqueous lecithin curd again extracted several times with additional portions of ethylene dichloride. Under these conditions the ethylene dichloride removes non-phospholipin substances, such as cholesterol, from the crude lecithin emulsion without dissolving the lecithin itself. This lecithin residue consists essentially of highly pure lecithin associated with water and any residual ethylene dichloride. The mixture is subjected to distillation or evaporation to concentrate it to about one-half to one-third of its original volume and then dried in any suitable manner, as, for example, in a vacuum drum dryer or on vacuum pans.

Alternatively, the extracted lecithin curd referred to above can be concentrated to about 50% of its original volume and the lecithin therein precipitated by the addition of an equal volume of acetone. The acetone-precipitated lecithin can then be pan-dried at low temperature.

The product obtained is 95% to 98% lecithin and has a satisfactory color.

In the example given above enough water is present, namely 10% or more of the amount of egg yoke, to insure retention of the lecithin in the aqueous phase while the simple and derived lipids collect in the ethylene dichloride phase.

As a fourth example illustrating our invention, we shall describe the separation of the antimenorrhagic factor from liver residues resulting from the extraction of liver with aqueous mixtures.

*Example 4*

In the preparation of liver extract to be used for the treatment of anemia the liver, either pork or beef, or both, is minced and treated with about 3 volumes of water. If desired, the water is adjusted to pH of about 5 to about 6 in order to facilitate this extraction. The liver and water mixture is heated to remove coagulable proteins, the temperature preferably not exceeding 85° C. The mixture is then filtered and the filtrate is worked up in any desired manner to be used in the treatment of anemia. The residue contains the antimenorrhagic factor.

6.8 kilograms of wet residue from the aqueous extraction of mixed hog and beef liver are extracted, with vigorous agitation, with 17 liters of ethylene dichloride, and then again with two successive 12 liter portions of ethylene dichloride. The extracts are combined and concentrated in vacuo to yield 279 grams of a fatty residue.

This material is then extracted three times with alcohol, using 600 cc. of alcohol for the first extraction and 450 cc. for the second and third extractions. These extracts are combined, filtered and concentrated in vacuo. The residue obtained is dissolved in a liquid aliphatic hydrocarbon, such as gasoline, and the solution obtained is extracted seven times with 500 cc. portions of 90% methanol. The methanol extracts are combined and evaporated to dryness to yield 33.3 grams of a dark oil which is the antimenorrhagic material.

In the above example we have shown how to effect a separation of the derived and simple lipids containing the antimenorrhagic factor from the compound lipids, and have also shown how the antimenorrhagic factor is ultimately recovered.

Having thus described our invention, what we claim is:

1. The process of separating compound lipids from material containing compound lipids and other lipids which comprises subjecting said materials to contact with ethylene dichloride in the presence of moisture, said moisture being in the amount of at least 10% by weight of the compound lipids in said material, and separating an aqueous phase containing said compound lipids from an ethylene dichloride phase containing other lipids.

2. The process of separating compound lipids from material containing compound lipids and other lipids which comprises subjecting said materials to contact with ethylene dichloride in the presence of moisture, said moisture being in the amount of at least 10% by weight of the compound lipids in said material, separating an aqueous phase containing said compound lipids from an ethylene dichloride phase containing other lipids, and recovering compound lipids from said aqueous phase.

3. The process of separating lecithin from a composition containing it in mixture with a sterol which comprises subjecting said composition to contact with ethylene dichloride in the presence of moisture, and separating an aqueous phase containing lecithin from an ethylene dichloride phase containing said sterol.

4. The process of separating lecithin from compositions containing it in mixture with a simple lipid which comprises subjecting said composition to contact with ethylene dichloride in the presence of moisture, and separating an aqueous phase containing lecithin from an ethylene dichloride phase containing said simple lipid.

5. The process of separating lecithin from egg yolk which comprises subjecting said egg yolk to contact with ethylene dichloride in the presence of moisture, and separating an aqueous phase containing lecithin from an ethylene dichloride phase.

6. The process of separating a phospholipid from a composition containing it in mixture with a sterol which comprises subjecting said composition to contact with ethylene dichloride in the presence of moisture, and separating an aqueous phase containing said phospholipid from an ethylene dichloride phase containing said sterol.

7. The process of separating a phospholipid from a composition containing it in mixture with a fat which comprises subjecting said composition to contact with ethylene dichloride in the presence of moisture, and separating an aqueous phase containing a phospholipid from an ethylene dichloride phase containing said fat.

8. The process of separating a glycolipid from a composition containing it in mixture with a sterol which comprises subjecting said composition to contact with ethylene dichloride in the presence of moisture, and separating an aqueous phase containing said glycolipid from an ethylene dichloride phase containing said sterol.

9. The process of separating a cerebroside from a composition containing it in mixture with a sterol which comprises subjecting said composition to contact with ethylene dichloride in the presence of moisture, and separating an aqueous phase containing said cerebroside from an ethylene dichloride phase containing said sterol.

10. The process of separating compound lipids from material containing compound lipids including a cerebroside, and containing also other than compound lipids, which comprises subjecting said material to contact with ethylene dichloride in the presence of moisture, said moisture being in the amount of at least ten percent by weight of the compound lipids in said material, and separating an aqueous phase containing said glycolipid from an ethylene dichloride phase containing lipids other than compound lipids.

11. The process of separating compound lipids from material containing compound lipids including a cerebroside, and containing also other than compound lipids, which comprises subjecting said material to contact with ethylene dichloride in the presence of moisture, said moisture being in the amount of at least ten percent by weight of the compound lipids in said material, and separating an aqueous phase containing said cerebroside from an ethylene dichloride phase containing lipids other than compound lipids.

12. In a process for separating derived and simple lipids from an animal liver material, the steps of subjecting said material to contact with ethylene dichloride in the presence of moisture, and separating an aqueous phase from an ethylene dichloride phase containing said derived and simple lipids.

13. In a process for preparing a fraction containing an antimenorrhagic factor from beef liver, the steps of subjecting said beef liver to contact with ethylene dichloride in the presence of moisture, and separating an aqueous phase from an ethylene dichloride phase containing said antomenorrhagic factor.

14. In a process for preparing a fraction containing an antimenorrhagic factor from pork liver, the steps of subjecting said pork liver to contact with ethylene dichloride in the presence of moisture, and separating an aqueous phase from an ethylene dichloride phase containing said antimenorrhagic factor.

15. In a process for separating derived and simple lipids from an animal liver material, the steps of extracting said material with water to remove a fraction containing compound lipids and derived and simple lipids, contacting said fraction with ethylene dichloride in the presence of moisture and separating an aqueous phase from an ethylene dichloride phase containing said derived and simple lipids.

16. In a process for preparing a fraction containing an antimenorrhagic factor from beef liver, the steps of extracting said beef liver with water to remove a fraction containing an antimenorrhagic factor, contacting said fraction with ethylene dichloride in the presence of moisture and separating an aqueous phase from an ethylene dichloride phase which contains said antimenorrhagic factor.

17. In a process for preparing a fraction containing an antimenorrhagic factor from pork liver, the steps of extracting said pork liver with water to remove a fraction containing an antimenorrhagic factor, contacting said fraction with ethylene dichloride in the presence of moisture and separating an aqueous phase from an ethylene dichloride phase which contains said antimenorrhagic factor.

18. In a process for separating derived and simple lipids from an animal liver material, the steps of mixing water with said material, heating said material to coagulate proteins contained therein, removing water along with water soluble materials from said mixture, thereafter subjecting said material to contact with ethylene dichloride in the presence of moisture, and separating an aqueous phase from an ethylene dichloride phase which contains said simple and derived lipids.

19. In a process for preparing a fraction containing an antimenorrhagic factor from beef liver, the steps of mixing water with said beef liver, heating said material to coagulate proteins contained therein, removing water along with water soluble materials from said mixture, thereafter subjecting said material to contact with ethylene dichloride in the presence of moisture, and separating an aqueous phase from an ethylene dichloride phase which contains the antimenorrhagic factor.

20. In a process for preparing a fraction containing an antimenorrhagic factor from pork liver, the steps of mixing water with said pork liver, heating said material to coagulate proteins contained therein, removing water along with water soluble materials from said mixture, thereafter subjecting said material to contact with ethylene dichloride in the presence of moisture, and separating an aqueous phase from an ethylene dichloride phase which contains the antimenorrhagic factor.

ROBERT H. SIFFERD.
JULES D. PORSCHE.

REFERENCES CITED

The following references are of record in the file of this patent:

UNITED STATES PATENTS

| Number | Name | Date |
|---|---|---|
| 1,941,097 | Light | Dec. 26, 1933 |
| 2,182,767 | Thurman | Dec. 5, 1939 |
| 2,191,260 | Porsche | Feb. 20, 1940 |
| 2,371,476 | Sifferd | Mar. 13, 1945 |